United States Patent
He et al.

(10) Patent No.: US 10,660,088 B2
(45) Date of Patent: May 19, 2020

(54) ACK/NACK FEEDBACK METHOD IN WIRELESS COMMUNICATION SYSTEM

(71) Applicant: Samsung Electronics Co., Ltd., Suwon-si, Gyeonggi-do (KR)

(72) Inventors: Hong He, Beijing (CN); Yingyang Li, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 15/375,860

(22) Filed: Dec. 12, 2016

(65) Prior Publication Data

US 2017/0094658 A1 Mar. 30, 2017

Related U.S. Application Data

(62) Division of application No. 14/239,415, filed as application No. PCT/KR2012/006517 on Aug. 16, 2012, now abandoned.

(30) Foreign Application Priority Data

Aug. 15, 2011 (CN) .......................... 2011 1 0270303
Aug. 16, 2012 (KR) ........................ 10-2012-0089459

(51) Int. Cl.
*H04L 5/14* (2006.01)
*H04W 72/04* (2009.01)
(Continued)

(52) U.S. Cl.
CPC ....... *H04W 72/0446* (2013.01); *H04L 1/0034* (2013.01); *H04L 1/1854* (2013.01);
(Continued)

(58) Field of Classification Search
None
See application file for complete search history.

(56) References Cited

U.S. PATENT DOCUMENTS 8,817,755 B2 * 8/2014 Wang ................. H04N 21/2365
370/336
9,042,286 B2 5/2015 Vannithamby et al.
(Continued)

FOREIGN PATENT DOCUMENTS

CN 101772220 A 7/2010
CN 102075949 A * 5/2011 ............. H04L 5/001
(Continued)

OTHER PUBLICATIONS

Intel Corporation,"Support of Mixed Inter-Band TDD Configurations in Rel-11 CA", 3GPP TSG RAN2 Meeting #74, R2-113216, May 9-13, 2011.

(Continued)

*Primary Examiner* — Willie J Daniel, Jr.
(74) *Attorney, Agent, or Firm* — Jefferson IP Law, LLP

(57) ABSTRACT

Embodiments of the present invention disclose an ACK/NACK feedback method in a wireless communication system, including: determining, by a UE, number of public sub-frames, all of which are uplink sub-frame in PCC and any SCC sub-frames of any radio frame in frame structure configurations according to the frame structure configurations of the PCC and any SCC; selecting, by the UE, a configuration, uplink sub-frames of which merely include sub-frames corresponding to the determined number of public sub-frames from existing seven kinds of frame structure configurations; and feeding back, by the UE, to a eNB ACK/NACK information corresponding to PDSCH in the SCC on the PCC adopting a timing relationship between the PDSCH and the ACK/NACK corresponding to the selected configuration. With the ACK/NACK feedback method of the (Continued)

present invention, the UE may adaptively feed back the ACK/NACK according to the configured frame structure configuration of the CC, the carrier aggregation between Bands of different frame structure configurations is effectively supported and the coexistence and performance optimization of different communication systems is implemented without limiting the number of amplifiers of the UE.

8 Claims, 9 Drawing Sheets

(51) Int. Cl.
H04L 5/00 (2006.01)
H04L 1/18 (2006.01)
H04L 1/00 (2006.01)

(52) U.S. Cl.
CPC ............ *H04L 1/1893* (2013.01); *H04L 5/001* (2013.01); *H04L 5/0055* (2013.01); *H04L 5/0092* (2013.01); *H04L 5/0094* (2013.01); *H04L 5/14* (2013.01); *H04L 5/1469* (2013.01); *H04L 5/0044* (2013.01); *H04L 5/0073* (2013.01)

(56) References Cited

U.S. PATENT DOCUMENTS

| | | |
|---|---|---|
| 2006/0109848 A1 | 5/2006 | Blasco Claret et al. |
| 2009/0274086 A1 | 11/2009 | Petrovic et al. |
| 2010/0034156 A1 | 2/2010 | Malladi |
| 2012/0257554 A1 | 10/2012 | Kim et al. |
| 2012/0327821 A1* | 12/2012 | Lin .................... H04W 72/048 370/280 |
| 2013/0114658 A1 | 5/2013 | Davydov et al. |
| 2013/0142113 A1 | 6/2013 | Fong et al. |
| 2013/0279377 A1 | 10/2013 | Zhao et al. |
| 2014/0022962 A1 | 1/2014 | Yang et al. |
| 2014/0140251 A1 | 5/2014 | Pan et al. |
| 2014/0341094 A1 | 11/2014 | Yang et al. |

FOREIGN PATENT DOCUMENTS

| | | |
|---|---|---|
| CN | 102075949 A | 5/2011 |
| EA | 008785 B1 | 8/2007 |
| EP | 2 658 303 A1 | 10/2013 |
| EP | 2 672 775 A1 | 12/2013 |
| JP | 2014-512112 A | 5/2014 |
| JP | 2014-514812 A | 6/2014 |
| RU | 2 426 242 C2 | 8/2011 |
| WO | 2011/078581 A2 | 6/2011 |
| WO | 2012-124969 A2 | 9/2012 |
| WO | 2012-128599 A2 | 9/2012 |
| WO | 2013/007152 A1 | 1/2013 |
| WO | 2013/066387 A1 | 5/2013 |

OTHER PUBLICATIONS

Nokia Siemens networks, et al.,"Cell specific TDD configuration with inter-band CA", 3GPP TSG RAN2 Meeting #74, R2-112946, May 9-13, 2011.
CATT, "HARQ and Cross-carrier Scheduling for Different TDD", 3GPP TSG RAN2 Meeting #74, R2-112798, May 9-13, 2011.
Renesas Mobile Europe, "Operation Principles of CC specific TDD Configuration", 3GPP TSG RAN2 Meeting #74, R2-112938, May 9-13, 2011.
CATT, "Consideration on Different TDD Configuration", 3GPP TSG RAN2 Meeting #74, R2-112816, May 9-13, 2011.
Nokia, Nokia Siemens Networks; "Mapping of Access-backhaul Partitioning Solutions to TDD Configurations[online]", Feb. 16, 2010; 3GPP TSG RAN WG1#60; R1-101442.

* cited by examiner

ACK/NACK FEEDBACK METHOD IN WIRELESS COMMUNICATION SYSTEM

CROSS-REFERENCE TO RELATED APPLICATION(S)

This application is a divisional application of prior application Ser. No. 14/239,415, filed on Feb. 18, 2014, also this application claims the benefit under 35 U.S.C. § 371 of an International application filed on Aug. 16, 2012 and assigned application number PCT/KR2012/006517 and claimed the benefit under 35 U.S.C § 119(a) of a Korean patent application filed on Aug. 16, 2012 in the Korean Intellectual Property Office and assigned Serial number 10-2012-0089459 and a Chinese patent application filed on Aug. 15, 2011 in the Chinese Intellectual Property office and assigned Serial number 201110270303.1, the entire disclosure of which is hereby incorporated by reference.

TECHNICAL FIELD

The present invention relates to a field of mobile communication technology, and more particularly, to an Acknowledgement (ACK)/Non Acknowledgement (NACK) feedback method in a wireless communication system.

BACKGROUND ART

In the $3^{rd}$ Generation Partnership Project (3GPP) Long Term Evolution (LTE) standard, a downlink transmission technology is based on Orthogonal Frequency Division Multiplexing (OFDM) and an uplink transmission technology is based on Single-Carrier Frequency Division Multiple Access (SC-FDMA).

The LTE system uses two types of frame structure, i.e., frame structure type 1 adopting Frequency-Division Duplex (FDD) and frame structure type 2 adopting Time Division Duplex (TDD). Frame structure type 2 includes seven kinds of frame structure configurations. The proportion of downlink sub-frames in each kind of frame structure configuration is fixed, ranging from 40% to 90%. As shown in FIG. 1, it can be clearly perceived from FIG. 1 that each radio frame consists of 10 radio sub-frames, and numbered sequentially from zero. Take configuration 0 for example:

Sub-frame 0 and sub-frame 5 are used for sending downlink data, i.e., the sub-frame 0 and sub-frame 5 are used by the Evolved NodeB (eNB) for sending information to the User Equipment (UE).

Sub-frames 2, 3 and 4 and sub-frames 7, 8 and 9 are used for sending uplink data, i.e., the sub-frames 2, 3, 4, 7, 8 and 9 are used by the UE for sending information to the eNB.

Sub-frame 1 and sub-frame 6 are known as special sub-frames, consisting of three special time slots. The three special time slots are respectively defined as Downlink Pilot Time Slot (DwPTS), Guard Period (GP) and Uplink Pilot Time Slot (UpPTS). The length of time of the DwPTS, GP, and UpPTS is variable. The specific value of the length of the time is configured by the system. The special sub-frames are used for sending the downlink data, and can be regarded as truncated downlink sub-frames.

The subsequent evolution of the LTE system is known as the "LTE-Advanced," called LTE-A for short. An objective of the LTE-A is meeting system requirements of the International Mobile Telecommunications (IMT)-Advanced advanced by the ITU. A critical enhanced objective of the IMT-Advanced includes further enhanced data rate, interoperability/compatibility with other systems and worldwide roaming characteristics, etc. The objective of the data rate for downlink is 1 Gbps and the objective of the data rate for uplink is 500 Mbps.

Based on the above objectives, a concept of Carrier Aggregation (CA) is introduced into LTE version 10. The spectral efficiency of wireless resources is further improved by aggregating multiple continuous or discontinuous carriers into system bandwidth up to 100 Mhz and using the Multiple-Input Multiple-Output (MIMO) technology applied in the LTE-A uplink and downlink. The system of LTE version 10 is already able to meet the system requirements of the IMT-Advanced. However, in the actual network deployment and system operation, in most cases, competition of the spectrum and scattered available spectrum makes such a large-scale continuous spectrum aggregation unrealistic. In order to obtain the target peak rate of the system of LTE version 10, in the future, the system has to adopt the discontinuous spectrum allocation and bandwidth aggregation. While the discontinuous spectrum aggregation means that there are big differences between interferences of different frequency bands. Especially for the network deployment of the Time Division (TD)-LTE system, the interference between the uplink and downlink severely restricts performances of the TD-LTE system.

Based on the above analysis, in the future evolution of the TD-LTE system, an important issue to be considered in the evolution of the TD-LTE system is applying different frame structure configurations to different Component Carriers (CC)s. In the system of LTE Rel-10, when a UE is configured with multiple CCs, an eNB notifies the UE of the number of the Primary Component Carrier (PCC) and the number of aggregated Secondary Component Carriers (SCC)s through high-level signaling. In addition, when the multiple CCs configured for the UE are in different frequency bands, and the frame structure configuration of at least one CC is different from the frame structure of other CCs, how to design a timing relationship between a downlink data sub-frame Physical Downlink Shared Channel (PDSCH) and Uplink (UL) control information, and more specifically how to feed back the ACK/NACK becomes a key issue to be solved when the carrier aggregation between different bands adopts different frame structure configurations.

DISCLOSURE OF INVENTION

Technical Problem

At present, on the basis of rational technical analysis, the following two solutions are mainly adopted.

The first one is on the assumption that all UEs supporting a carrier aggregation technology between different bands and characteristics of different frame structure configurations includes at least two Power Amplifiers (PA)s and Radio frequency (RF) circuits. Specifically, refer to the feedback method described in FIG. 2, i.e., when all CCs of the UE are in two different bands and the frame structure configurations in either a different band are the same, while the frame structure in different bands is different, the eNB designates a CC for feeding back ACK/NACK information for each UE in each band through the high-level signaling. Each band continues to use an existing timing relationship between the PDSCH and UL ACK/NACK in its band according to each different frame structure configuration. Although this method can successfully feed back the ACK/NACK information, requires that all UEs supporting the carrier aggregation technology between different bands and characteristics of different frame structure configurations include at least two PAs, which greatly increases the cost of the Rel-11 terminal and restricts the realization and market of the Rel-11 products. Further, as for cell edge users with limited power, the characteristics of Cubic Metric (CM) needs to be considered when sending the UL ACK/NACK information on multiple CCs, and the efficiency of the amplifier of the UE needs to be further reduced, which inevitably deteriorates the performances of the UL ACK/ANCK and even makes the UL ACK/ANCK can not be correctly received for the cell edge users with insufficient power.

Therefore, the problem of the above method leads to a second method, i.e., merely sending the UL ACK/NACK information on a single PCC to ensure that even low-end users with only one PA in the Rel-11 system still can benefit from the carrier aggregation technology between different bands with different frame structure configurations, and continue to use the existing power control mechanism of the UL ACK/NACK information. A typical method includes: designing a new timing relationship between the PDSCH and UL ACK/NACK for taking Load Balancing (LB) characteristics of the UL ACK/NACK into account. Although this method can correctly feed back the ACK/NACK on the basis of overcoming the problem of the first method, the biggest concern is that the new timing relationship between the PDSCH and UL ACK/NACK needs a scheduler to use new scheduling policy for allocating and scheduling resources, i.e., the method needs to change the existing scheduler algorithms.

On the basis of the above analysis, the existing ACK/NACK feedback technical solutions have different problems. Therefore, finding a feasible timing relationship between the PDSCH and UL ACK/NACK, i.e. how to feed back ACK/NACK becomes a primary technical problem of the LTE evolution version 11 to be solved.

Solution to Problem

In view of this, embodiments of the present invention provide an ACK/NACK feedback method in a wireless communication system, by which the UE may adaptively feed back the ACK/NACK according to the configured frame structure configuration of the CC, the carrier aggregation between Bands of different frame structure configurations is effectively supported and the coexistence and performance optimization of different communication systems is implemented without limiting the number of amplifiers of the UE.

In order to achieve the above objective, the technical solution of the present invention is accomplished in the following way:

An ACK/NACK feedback method in a wireless communication system includes:

determining, by a UE, number of public sub-frames, all of which are uplink sub-frame in PCC and SCC sub-frames of any radio frame in frame structure configurations according to the frame structure configurations of the PCC and any SCC;

selecting, by the UE, a configuration, uplink sub-frames of which merely include sub-frames corresponding to the determined number of public sub-frames from existing seven kinds of frame structure configurations; and feeding back, by the UE, to a eNB ACK/NACK information corresponding to PDSCH in the SCC on the PCC adopting a timing relationship between the PDSCH and the ACK/NACK corresponding to the selected configuration.

The method further includes: feeding back, by the UE, to the eNB the ACK/NACK information corresponding to the PDSCH in the PCC on the PCC adopting the timing relationship between the PDSCH and ACK/NACK corresponding to the selected configuration.

The method further includes: feeding back, by the UE, to the eNB the ACK/NACK information corresponding to the PDSCH in the PCC on the PCC adopting the timing relationship between the PDSCH and the ACK/NACK corresponding to the frame structure configuration of the PCC.

When a bundled window of downlink data sub-frames determined by the UE includes uplink data sub-frames, the method further includes:

mapping the ACK/NACK corresponding to the uplink data sub-frames into a Discontinuous Transmission, DTX, status, or not feeding back any ACK/NACK information.

When the UE is configured with more than two PCCs, before determining, by the UE, the number of public sub-frames, all of which are uplink sub-frame in PCC and any SCC sub-frames of a radio frame in the frame structure configurations, the method further includes: notifying, by the eNB, the UE of number of PCC for feeding back the ACK/NACK through Radio Resource Control, RRC, signaling.

The method for selecting, by the UE, a configuration, uplink sub-frames of which merely include sub-frames corresponding to the determined number of public sub-frames from existing seven kinds of frame structure configurations includes:

supposing that in any radio frame of the frame structure configurations, a configuration including two uplink and downlink sub-frame switching points is the configuration of the first class and the other configurations are the configurations of the second class, the two kinds of configurations of UE are configuration A and configuration B;

selecting, by the UE, configuration B when configuration A and configuration B belong to a same class of configuration, and proportion of uplink sub-frames in configuration A is larger than that of configuration B;

selecting, by the UE, a configuration other than configuration 0 in configuration A and configuration B when configuration A and configuration B do not belong to a same class of configuration, and either of configuration A and configuration B is configuration 0;

selecting, by the UE, a configuration other than configuration 6 in configuration A and configuration B when configuration A and configuration B do not belong to a same class of configuration, and neither of configuration A and configuration B is configuration 0 and either of them is configuration 6;

selecting, by the UE, configuration 5 when configuration A and configuration B do not belong to a class kind of configuration and either of configuration A and configuration B is configuration 5;

selecting, by the UE, configuration 4 when (A, B) is (1, 3) or (1, 4); and selecting, by the UE, configuration 5 when (A, B) is (2, 3) or (2, 4).

An ACK/NACK feedback method in a wireless communication system includes: notifying, by a eNB, a UE of configured information of a PCC and all SCCs through high-level signaling; wherein the configured information of the PCC and all SCCs of the UE includes: a frame structure configuration of each CC configured for the UE, and further includes: number of the PCC and all SCCs; determining, by the UE, a frame structure configuration according to the information of the frame structure configurations of the PCC and all SCCs sent from the eNB; and feeding back, by the UE, to the eNB, ACK/NACK information corresponding to PDSCH in the SCCs on the PCC adopting a timing relationship between the PDSCH and the ACK/NACK corresponding to the determined frame structure configuration.

The method for determining, by the UE, a frame structure configuration according to the information of the frame structure configurations of the PCC and all SCCs sent from the eNB includes: supposing that in any radio frame of the frame structure configurations, a configuration including two uplink and downlink sub-frame switching points is the configuration of the first class and the other configurations are the configurations of the second class, the two kinds of configurations of UE are configuration A and configuration B; determining, by the UE, configuration B when configuration A and configuration B belong to a same class of configuration, and proportion of uplink sub-frames in configuration A is larger than that of configuration B; determining, by the UE, a configuration other than configuration 0 in configuration A and configuration B when configuration A and configuration B do not belong to a same class of configuration, and either of configuration A and configuration B is configuration 0; determining, by the UE, a configuration other than configuration 6 in configuration A and configuration B when configuration A and configuration B do not belong to a same class of configuration, and neither of configuration A and configuration B is configuration 0 and either of them is configuration 6; determining, by the UE, configuration 5 when configuration A and configuration B do not belong to a same class of configuration and either of configuration A and configuration B is configuration 5; determining, by the UE, configuration 4 when (A, B) is (1, 3) or (1, 4); and determining, by the UE, configuration 5 when (A, B) is (2, 3) or (2, 4).

The method further includes: feeding back, by the UE, to the eNB the ACK/NACK information corresponding to the PDSCH in the PCC on the PCC adopting the timing relationship between the PDSCH and ACK/NACK corresponding to the determined configuration.

The method further includes: feeding back, by the UE, to the eNB the ACK/NACK information corresponding to the PDSCH in the PCC on the PCC adopting the timing relationship between the PDSCH and ACK/NACK corresponding to the frame structure configuration of the PCC.

When a bundled window of downlink data sub-frames determined by the UE includes uplink data sub-frames, the method further includes: mapping the ACK/NACK corresponding to the uplink data sub-frames into a Discontinuous Transmission, DTX, status, or not feeding back any ACK/NACK information.

In view of the above technical solutions, with the ACK/NACK feedback method in the wireless communication system provided by embodiments of the present invention, the UE determines the number of public sub-frames, all of which are uplink sub-frames in the PCC and SCC sub-frames of any radio frame according to the configured frame structure configurations of the PCC and any SCC, selects the configuration, the uplink frames of which merely include sub-frames corresponding to the determined number of the public sub-frames from the existing seven kinds of frame structure configurations, and feeds back to the eNB the ACK/NACK information corresponding to the PDSCH in the SCC on the PCC adopting the timing relationship between the PDSCH and ACK/NACK corresponding to the selected configuration. Alternatively, the eNB notifies the UE of the configured information of the PCC and all SCCs through the high-level signaling. The UE determines a frame structure configuration according to the information of the frame structure configurations of the PCC and all SCCs sent from the eNB, and feeds back to the eNB the ACK/NACK information corresponding to the PDSCH in the SCCs on the PCC using the timing relationship between the PDSCH and ACK/NACK corresponding to the determined frame structure configuration. Further, when the UE is configured with multiple CCs, and the frame structure configuration of at least one CC is different from the frame structure configurations of the other CCs, the method of the present invention may adaptively select and determine a timing relationship between the PDSCH and UL ACK/NACK according to the configured frame structure configuration of the CC without changing the existing algorithm of the scheduler, and feed back the ACK/NACK information on the PCC. Therefore, the ACK/NACK feedback method of the present invention may effectively support the carrier aggregation between Bands of different frame structure configurations and implement the coexistence and performance optimization of different communication systems without limiting the number of amplifiers of the UE.

Advantageous Effects of Invention

The ACK/NACK feedback method of the present invention may effectively support the carrier aggregation between Bands of different frame structure configurations and implement the coexistence and performance optimization of different communication systems without limiting the number of amplifiers of the UE.

MODE FOR THE INVENTION

The present invention is further described in detail hereinafter with reference to the accompanying drawings to make the objective, technical solution and merits thereof more apparent.

The main idea of the present invention is:

UE determines number of public sub-frames, all of which are uplink sub-frames in the PCC and SCC sub-frames of any radio frame in the frame structure configurations according to the configured frame structure configurations of the PCC and any SCC. The UE selects a configuration, the uplink frames of which merely include sub-frames corresponding to the determined number of the public sub-frames, from the existing seven kinds of frame structure configurations. The UE feeds back to the eNB the ACK/NACK information corresponding to the PDSCH in the SCC on the PCC adopting a timing relationship between the PDSCH and ACK/NACK corresponding to the selected configuration.

Alternatively, the eNB notifies the UE of the configured information of the PCC and all SCCs through high-level signaling. The configured information of the PCC and all SCCs of the UE includes the frame structure configuration of each CC configured for the UE, and further includes the number of the PCC and all SCCs. The UE determines a frame structure configuration according to the information of the frame structure configurations of the PCC and all SCCs sent from the eNB. The UE feeds back to the eNB the ACK/NACK information corresponding to the PDSCH in the SCCs on the PCC adopting the timing relationship between the PDSCH and ACK/NACK corresponding to the determined frame structure configuration.

Figure 1:
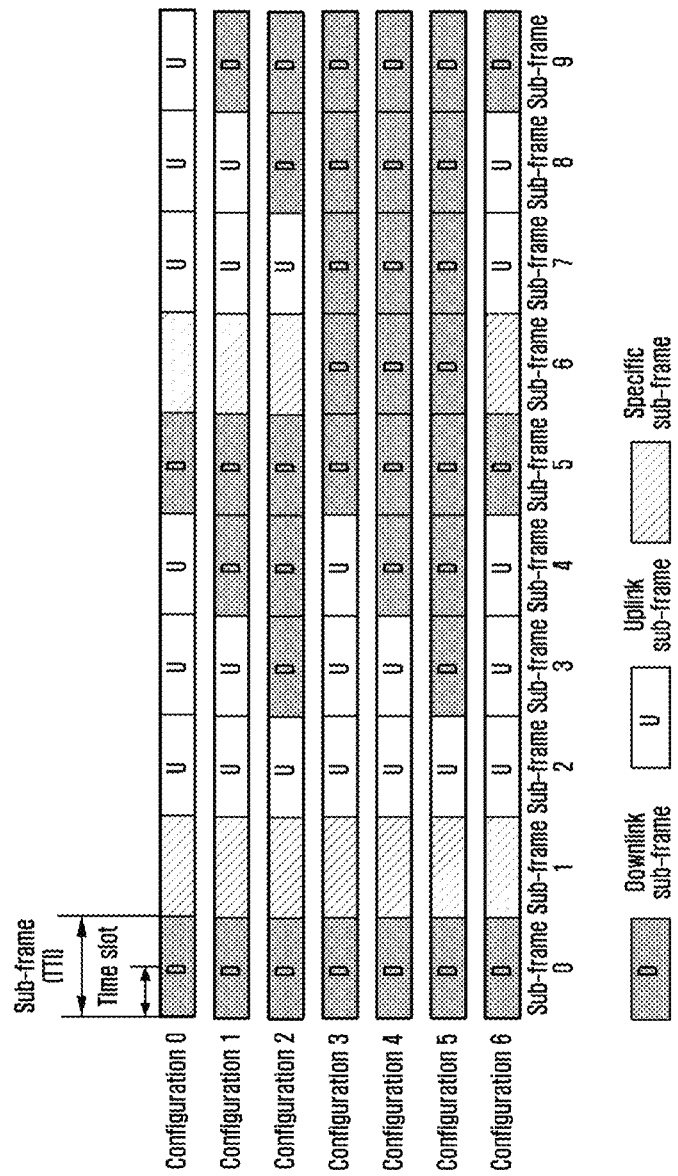
FIG. 1 is a schematic diagram illustrating frame structure configurations of an existing TD-LTE system.
Figure 2:
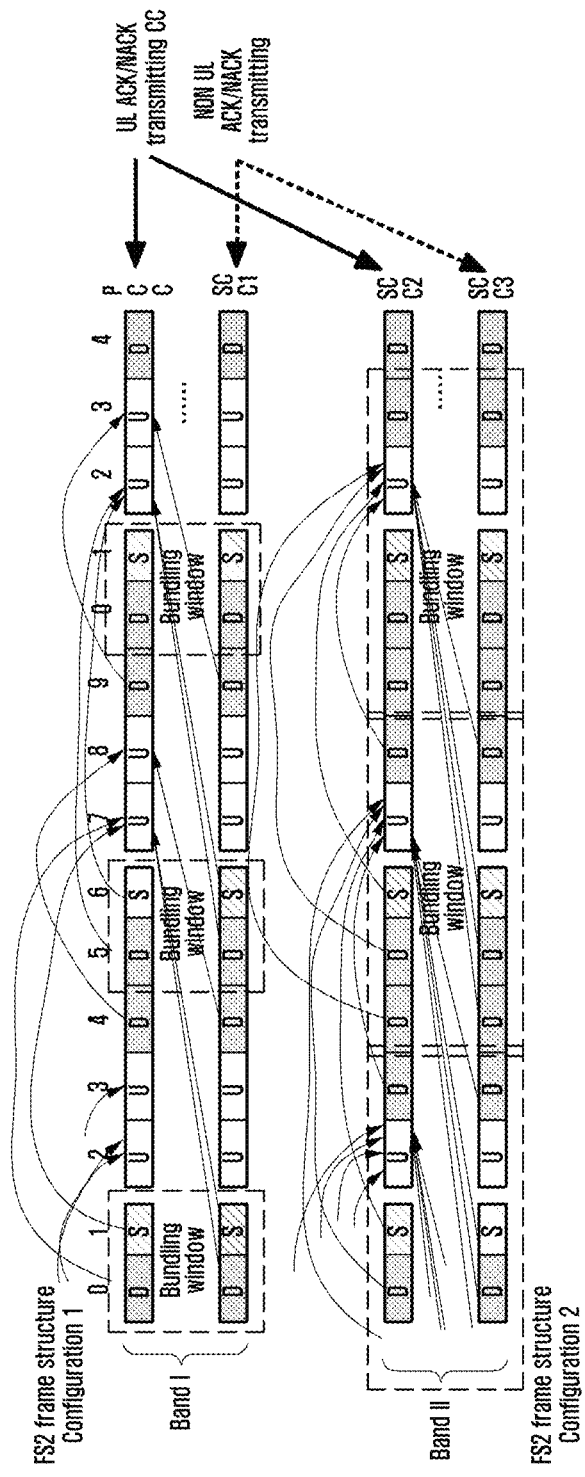
FIG. 2 is a scene schematic diagram illustrating an existing ACK/NACK feedback method.
Figure 3:
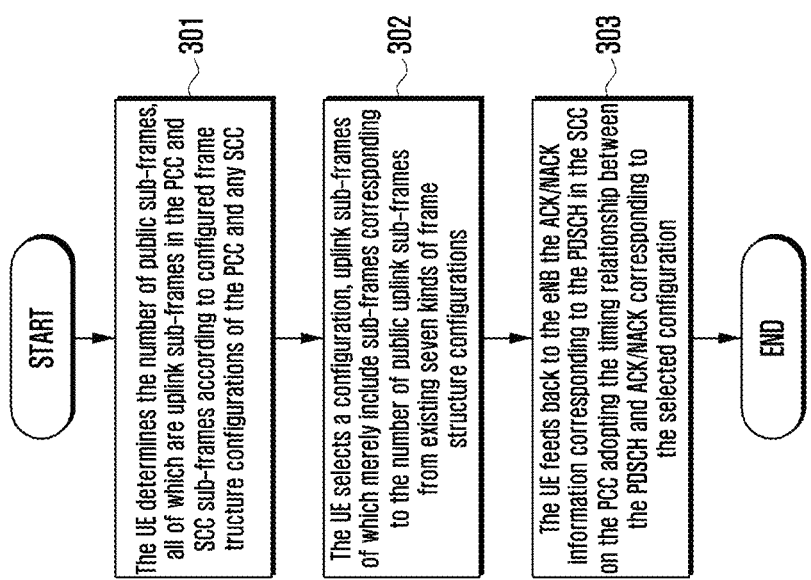
FIG. 3 is a work flow chart of ACK/NACK feedback method one according to an embodiment of the present invention.

FIG. 3 illustrates a work flow of ACK/NACK feedback method one according to an embodiment of the present invention. As shown in FIG. 3, the flow includes:

Block 301: UE determines number of public sub-frames, all of which are uplink sub-frames in the PCC and SCC sub-frames of any radio frame in the frame structure configurations according to the configured frame structure configurations of the PCC and any SCC.

It should be noted that when the UE is configured with more than two PCCs, the CC for feeding back the ACK/NACK is one of the PCCs. Therefore, before executing this block, the eNB notifies the UE of the number of the PCC used for feeding back the ACK/NACK through the Radio Resource Control (RRC) signaling.

Block 302: The UE selects a configuration, the uplink frames of which merely include sub-frames corresponding to the determined number of the public sub-frames, from the seven kinds of existing frame structure configurations.

The UE selects the configuration, the uplink frames of which merely include sub-frames corresponding to the determined number of the public sub-frames, i.e., selects the frame structure configuration, in which the sub-frames except for the uplink sub-frames, i.e. the sub-frames corresponding to the determined number of the public sub-frames are downlink sub-frames. In this block, the UE selecting the configuration, the uplink frames of which merely include sub-frames corresponding to the determined number of the public sub-frames, from the seven kinds of existing frame structure configurations specifically includes:

Suppose that in the frame structure configuration and any radio frame, the configuration including two uplink and downlink sub-frame switching points is the configuration of the first class and the other configurations are the configurations of the second class. The two kinds of configurations of UE are configuration A and configuration B.

When configuration A and configuration B belong to a same class of configuration, and the proportion of the uplink sub-frames in configuration A is larger than that of configuration B, the UE selects configuration B.

When configuration A and configuration B do not belong to a same class of configuration, and either of configuration A and configuration B is configuration 0, the UE selects the configuration other than the configuration 0 in configuration A and configuration B.

When configuration A and configuration B do not belong to a same class of configuration, neither of configuration A and configuration B is configuration 0 and either of them is configuration 6, the UE selects the configuration other than configuration 6 in configuration A and configuration B.

When configuration A and configuration B do not belong to a same class of configuration and either of configurations A and B is configuration 5, the UE selects the configuration 5.

When (A, B) is (1, 3) or (1, 4), the UE selects the configuration 4.

When (A, B) is (2, 3) or (2, 4), the UE selects the configuration 5.

Table 1 shows the result of frame structure configurations selected from the two different kinds of the frame structure configurations. As shown in table 1, one is frame structure configuration A, the other one is frame structure configuration B. The UE finds existing configuration C which is backward compatible frame structure configuration with the values of configuration A and configuration B. Configuration C may be one of configuration A and configuration B, or may be a new kind of frame structure configuration.

TABLE 1

|  |  | Frame structure configuration A | | | | | | |
|---|---|---|---|---|---|---|---|---|
|  |  | 0 | 1 | 2 | 3 | 4 | 5 | 6 |
| Frame structure configuration B | 0 |  | 1 | 2 | 3 | 4 | 5 | 6 |
|  | 1 | 1 |  | 2 | 4 | 4 | 5 | 1 |
|  | 2 | 2 | 2 |  | 5 | 5 | 5 | 2 |
|  | 3 | 3 | 4 | 5 |  | 4 | 5 | 3 |
|  | 4 | 4 | 4 | 5 | 4 |  | 5 | 4 |
|  | 5 | 5 | 5 | 5 | 5 | 5 |  | 5 |
|  | 6 | 6 | 1 | 2 | 3 | 4 | 5 |  |

Block 303: The UE feeds back to the eNB the ACK/NACK information corresponding to the PDSCH in the SCC on the PCC using the timing relationship between the PDSCH and ACK/NACK corresponding to the selected configuration.

It should be noted that in this block, for the PDSCH of the PCC, two ACK/NACK feedback manners may be adopted. One is the same as that of SCC, i.e., feeding back the ACK/NACK information on the PCC according to the timing relationship between the PDSCH and ACK/NACK corresponding to the selected configuration, That is, the UE may feed back the ACK/NACK information corresponding to all downlink data on a single CC, so that make the UL ACK/NACK obtained by mapping the PCC and SCC exactly the same as the timing relationship between the downlink data sub-frames. The other is feeding back the ACK/NACK information on the PCC according to the ACK/NACK timing relationship determined by its own frame structure configuration.

It should be noted that, for any configured CC, when the ACK/NACK information is fed back according to the timing relationship between the PDSCH and ACK/NACK corresponding to the selected configuration, and a bundled window of the downlink data sub-frames determined by the UE includes the uplink data sub-frames, the ACK/NACK corresponding to the uplink data sub-frames are definitively mapped into a Discontinuous Transmission (DTX) status, or not feeding back any ACK/NACK information.

At this point, the whole work flow of ACK/NACK feedback method one of the present invention is finished. In order to make the method of the present invention more apparent, examples are given hereafter for description.

Embodiment One

Figure 4:
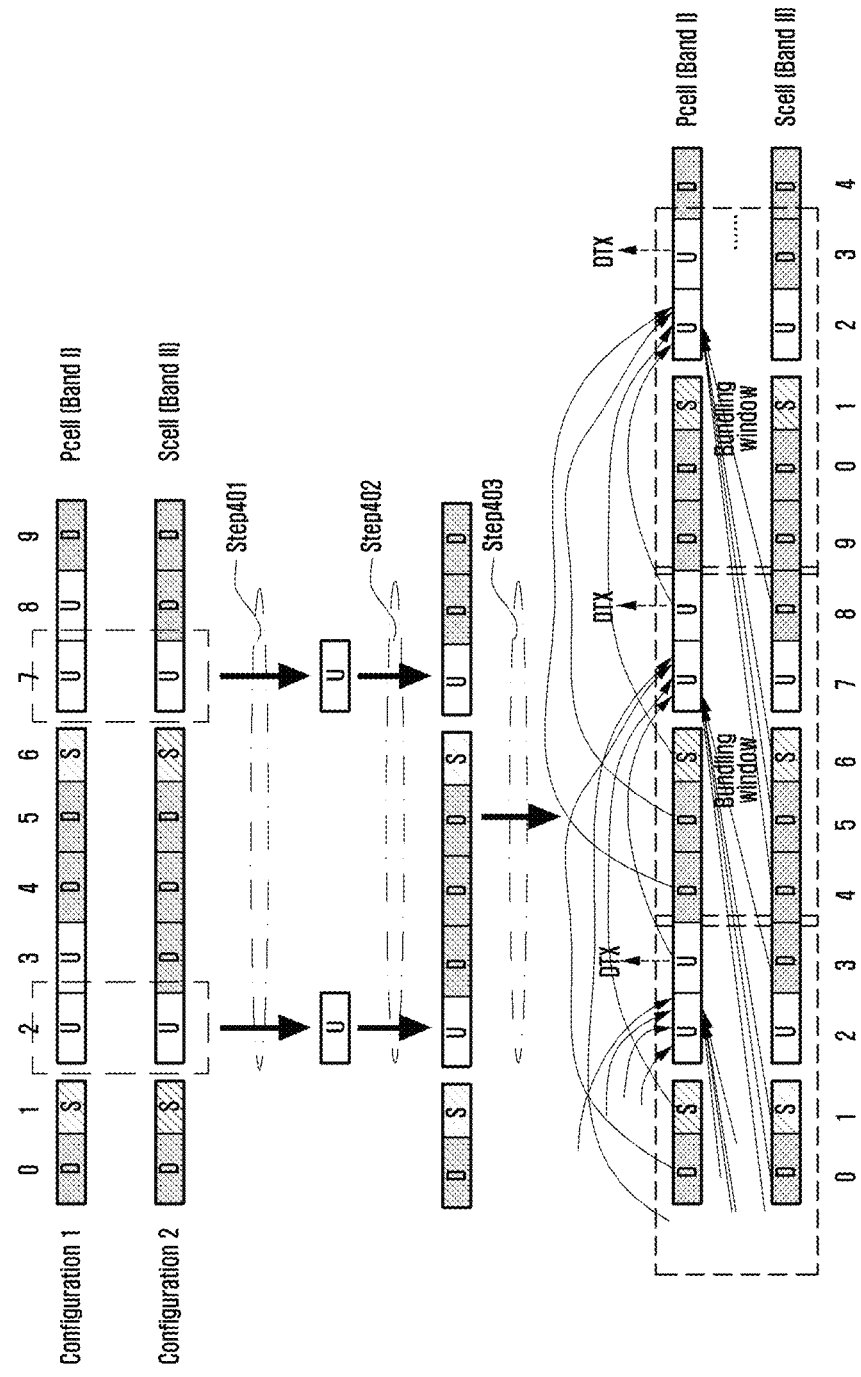
FIG. 4 is a scene schematic diagram illustrating a first embodiment of the present invention for determining ACK/NACK sub-frames.

In this embodiment, suppose that the UE is configured with two CCs, the number of which is CC0 and CC1. CC0 is PCC and CC1 is SCC. Based on the consideration of minimized adjacent channel interference, CC0 adopts frame structure configuration 1, while CC1 adopts frame structure configuration 2. Refer to the scene schematic diagram shown in FIG. 4 for the method for determining the ACK/NACK sub-frames. As shown in FIG. 4, the method includes:

Step 401: The UE determines the number of uplink public sub-frames, i.e. designates the number of the public uplink sub-frames as sub-frame 2 and sub-frame 7 according to the frame structure configurations of PCC and SCC.

Step 402: The UE selects the configuration, i.e., the frame structure configuration 2 in Frame Structure 2 (FS2), the uplink sub-frames of which merely include sub-frame 2 and sub-frame 7 from the existing seven kinds of frame structure configurations according to the result of step 401.

Step 403: The UE feeds back the ACK/NACK information for the PCC and all SCCs adopting the timing relationship between the PDSCH and ACK/NACK corresponding to the frame structure configuration 2 in the FS2.

It should be noted that in this embodiment, the PCC feeds back the ACK/NACK information according to the timing relationship between the PDSCH and ACK/NACK corresponding to the selected configuration. Thus, the UL ACK/NACK obtained by mapping the PCC and SCC is exactly the same as the timing relationship between the downlink data sub-frames.

Specifically, in this embodiment, both the eNB and UE definitely know that when specific sub-frames (the characteristics are that in the configured CC, this sub-frame is the downlink sub-frame of at least one CC, and meanwhile is the uplink sub-frame of at least one CC, such as, sub-frames 3 and 8 in FIG. 4) in the bundled window are uplink sub-frames of some CCs, the corresponding ACK/NACK mapping of the specific sub-frames in the bundled window is the DTC status.

Embodiment Two

Figure 5:
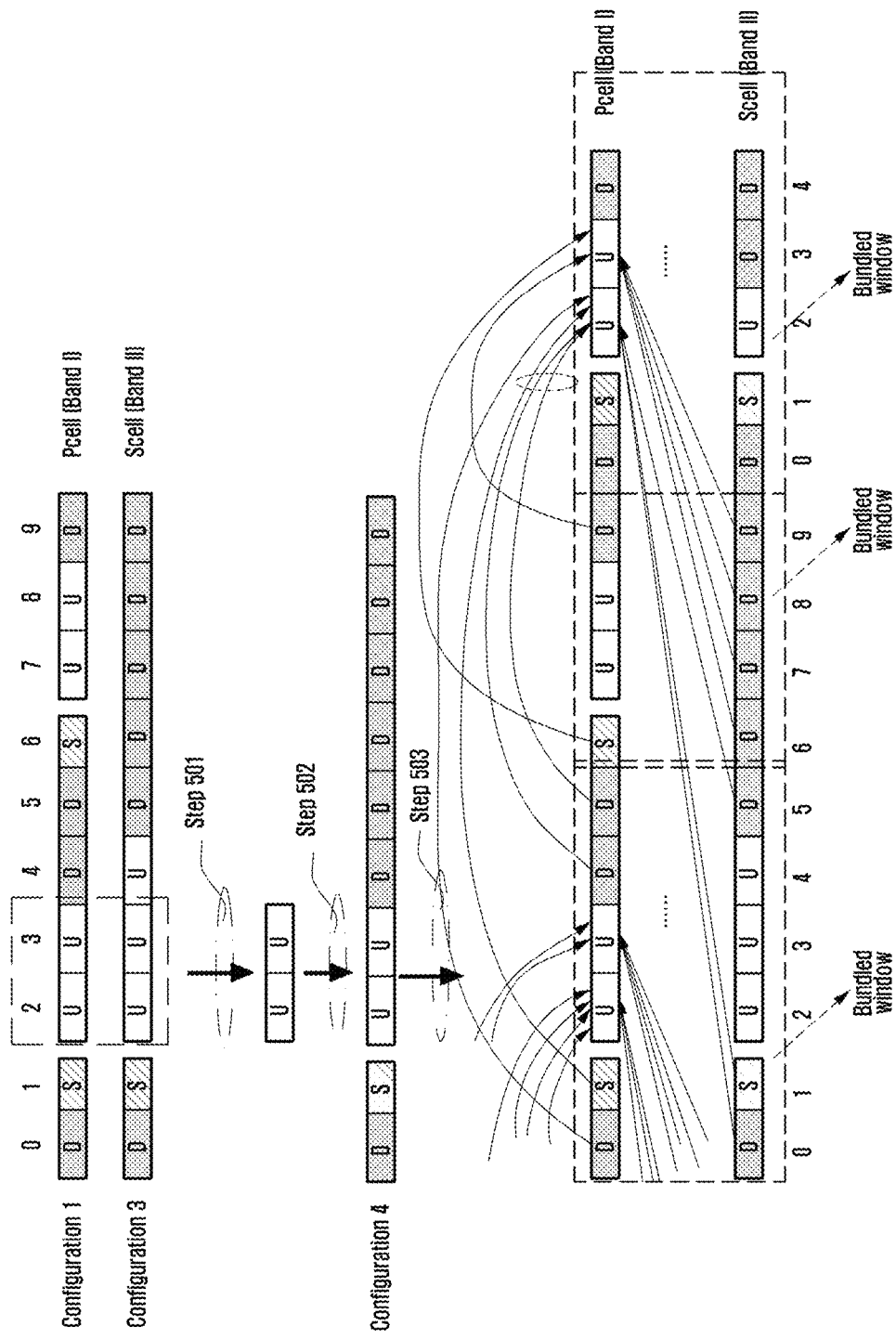
FIG. 5 is a scene schematic diagram illustrating a second embodiment of the present invention for determining ACK/NACK sub-frames.

In this embodiment, suppose that the UE is configured with two CCs, the number of which is CC0 and CC1. CC0 is PCC and CC1 is SCC. Based on the consideration of minimized adjacent channel interference, CC0 adopts frame structure configuration 1, while CC1 adopts frame structure configuration 3. Refer to the scene schematic diagram shown in FIG. 5 for the method for determining the ACK/NACK sub-frames. As shown in FIG. 5, the method includes:

Step 501: The UE determines the number of uplink public sub-frames, i.e. designates the number of the public uplink sub-frames as sub-frame 2 and sub-frame 3 according to the frame structure configurations of PCC and SCC.

Step 502: The UE selects the configuration, i.e., the frame structure configuration 4 in Frame Structure 2 (FS2), the uplink sub-frames of which merely include sub-frame 2 and sub-frame 3 from the existing seven kinds of frame structure configurations according to the result of step 501.

Step 503: The UE feeds back the ACK/NACK information for the PCC and all SCCs adopting the timing relationship between the PDSCH and ACK/NACK corresponding to the frame structure configuration 4 in the FS2.

It should be noted that same as embodiment one, the PCC also feeds back the ACK/NACK information according to the timing relationship between the PDSCH and ACK/NACK corresponding to the selected configuration.

Specifically, in this embodiment, both the eNB and UE definitely know that when specific sub-frames (the characteristics are that in the configured CC, this sub-frame is the downlink sub-frame of at least one CC, and meanwhile is the uplink sub-frame of at least one CC, such as, sub-frames 7 and 8 in FIG. 5) in the bundled window are uplink sub-frames of some CCs, this embodiment does not feed back any ACK/NACK information for the specific sub-frames in the bundled window.

Embodiment Three

Figure 6:
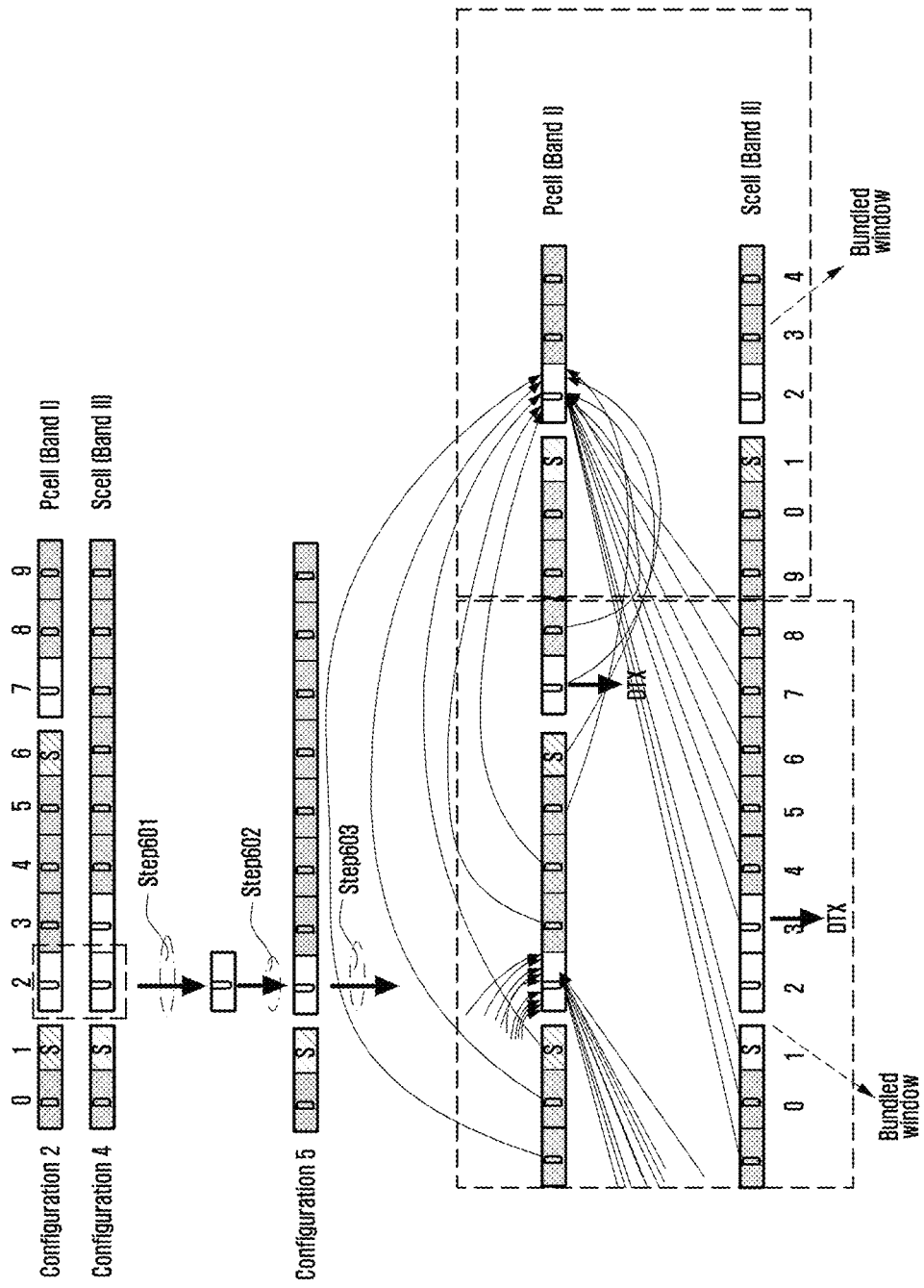
FIG. 6 is a scene schematic diagram illustrating a third embodiment of the present invention for determining ACK/NACK sub-frames.

In this embodiment, suppose that the UE is configured with two CCs, the number of which is CC0 and CC1. CC0 is PCC and CC1 is SCC. Based on the consideration of minimized adjacent channel interference, CC0 adopts frame structure configuration 2, while CC1 adopts frame structure configuration 4. Refer to the scene schematic diagram shown in FIG. 6 for the method for determining the ACK/NACK sub-frames. As shown in FIG. 6, the method includes:

Step 601: The UE determines the number of uplink public sub-frames, i.e. designates the number of the public uplink sub-frames as sub-frame 2 according to the frame structure configurations of PCC and SCC.

Step 602: The UE selects the configuration, i.e., the frame structure configuration 5 in Frame Structure 2 (FS2), the uplink sub-frames of which merely include sub-frame 2 from the existing seven kinds of frame structure configurations according to the result of step 601.

Step 603: The UE feeds back the ACK/NACK information for the PCC and all SCCs adopting the timing relationship between the PDSCH and ACK/NACK corresponding to the frame structure configuration 5 in the FS2.

Similarly, in this embodiment, both the eNB and UE definitely know that when specific sub-frames (the characteristics are that in the configured CC, this sub-frame is the downlink sub-frame of at least one CC, and meanwhile is the uplink sub-frame of at least one CC, such as, sub-frame 3 in FIG. 6) in the bundled window are uplink sub-frames of some CCs, the corresponding ACK/NACK mapping of the specific sub-frames in the bundled window is the DTC status.

Embodiment Four

Figure 7:
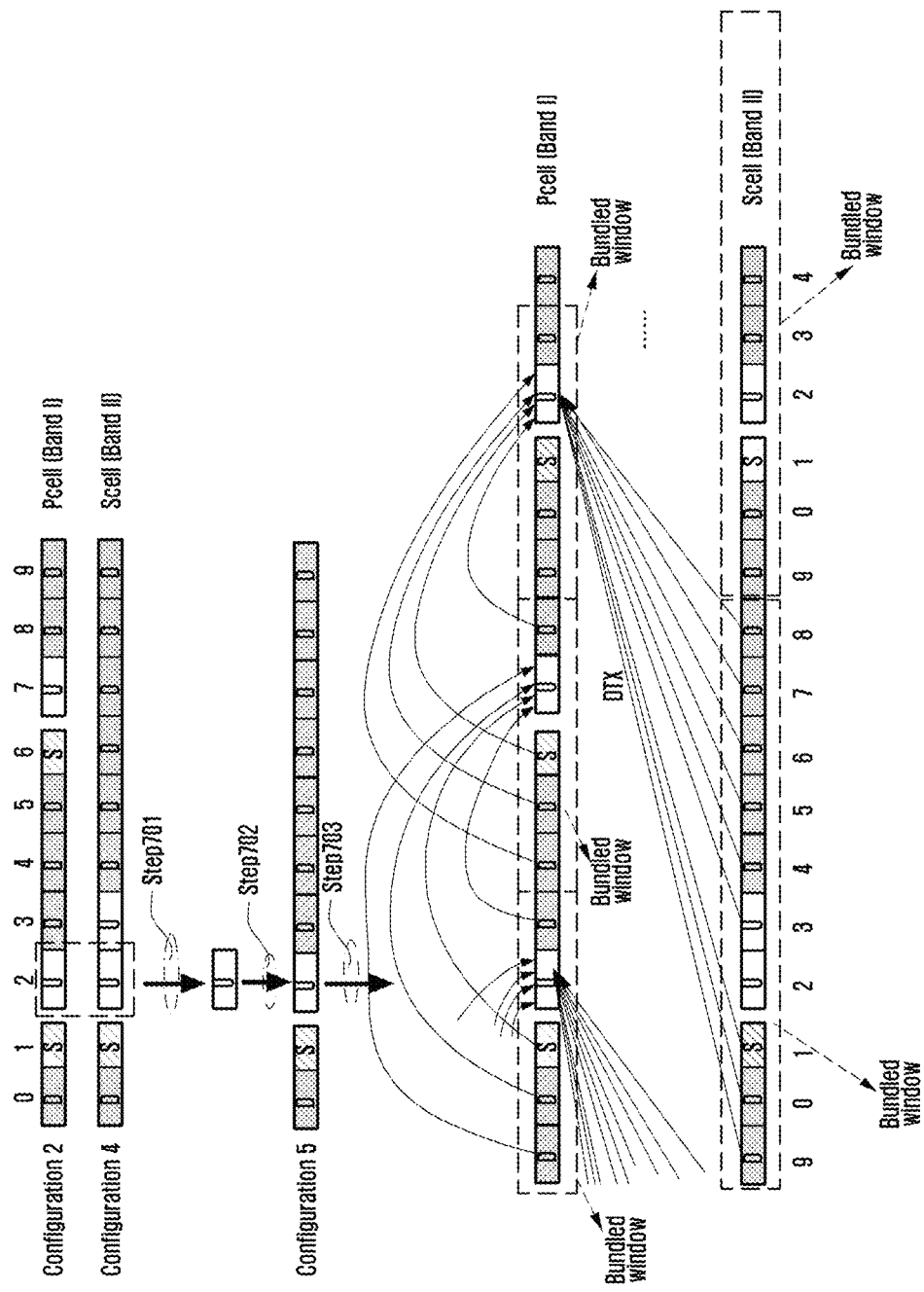
FIG. 7 is a scene schematic diagram illustrating a fourth embodiment of the present invention for determining ACK/NACK sub-frames.

In this embodiment, suppose that the UE is configured with two CCs, the number of which is CC0 and CC1. CC0 is PCC and CC1 is SCC. Based on the consideration of minimized adjacent channel interference, CC0 adopts frame structure configuration 2, while CC1 adopts frame structure configuration 4. Refer to the scene schematic diagram shown in FIG. 7 for the method for determining the ACK/NACK sub-frames. As shown in FIG. 7, the method includes:

Step 701: The UE determines the number of uplink public sub-frames, i.e. the sub-frame 2 in the figure according to the frame structure configurations of the PCC and SCC.

Step 702: The UE selects the configuration, i.e., the frame structure configuration 5 in Frame Structure 2 (FS2), the uplink sub-frames of which merely include sub-frame 2 from the existing seven kinds of frame structure configurations according to the result of step 701.

Step 703: The UE merely feeds back the ACK/NACK information for the SCC adopting the timing relationship between the PDSCH and ACK/NACK corresponding to the frame structure configuration 5 in the FS2. While the PCC still determines the timing relationship between the PDSCH and ACK/NACK according to the frame structure configuration of a real PCC.

It should be noted that in this embodiment, the PCC feeds back the ACK/NACK information adopting its own frame structure configuration.

Further, it should be noted that in this embodiment, both the eNB and UE definitely know that when specific sub-frames (the characteristics are that in the configured CC, this sub-frame is the downlink sub-frame of at least one CC, and meanwhile is the uplink sub-frame of at least one CC, such as, sub-frame 7 in FIG. 7) in the bundled window are uplink sub-frames of some CCs, this embodiment does not feed back any ACK/NACK information for the specific sub-frames in the bundled window.

Embodiment Five

Figure 8:
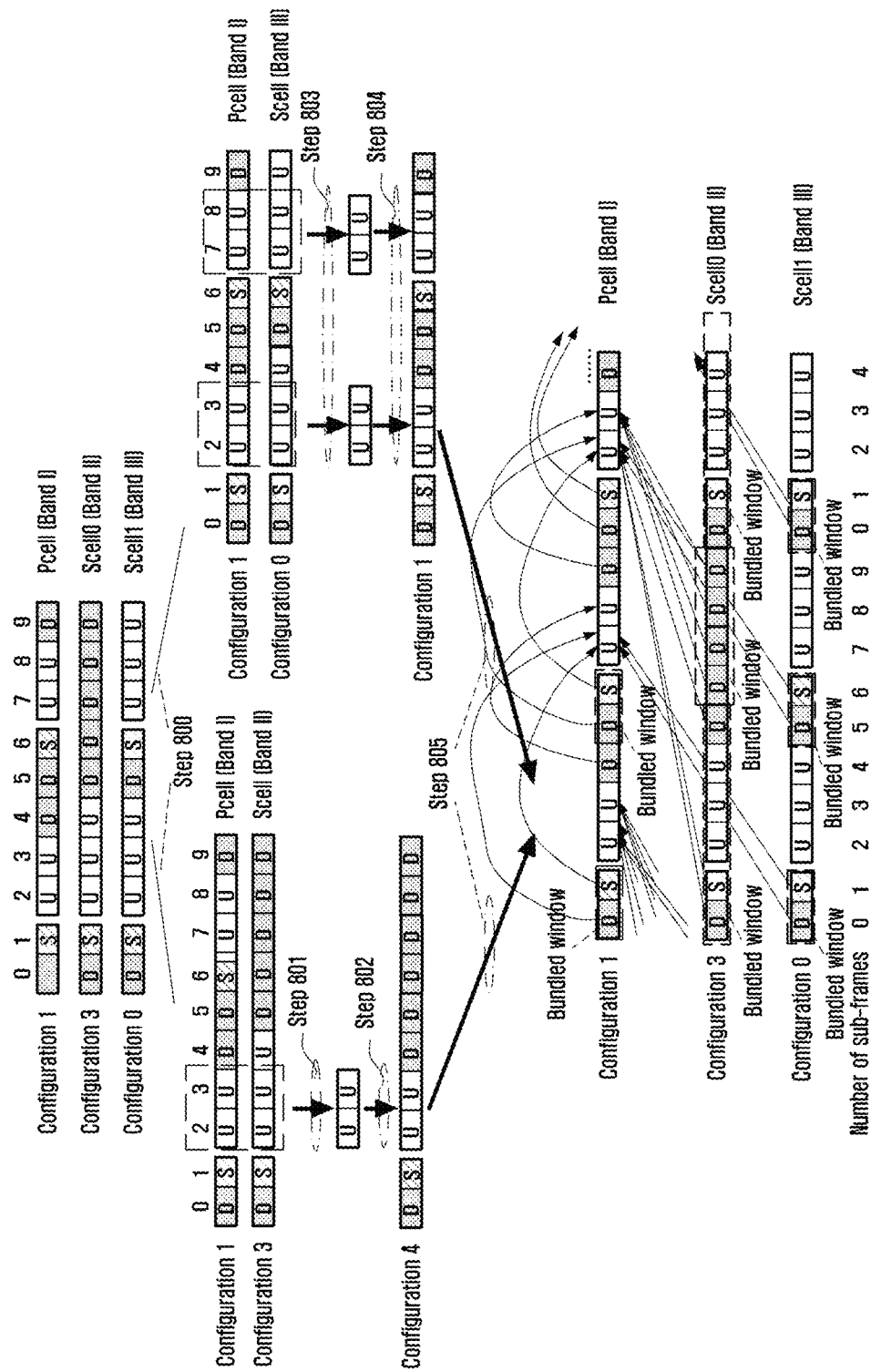
FIG. 8 is a scene schematic diagram illustrating a fifth embodiment of the present invention for determining ACK/NACK sub-frames.

In this embodiment, suppose that the UE is configured with three CCs, respectively in different bands. Suppose that the number of the three CCs is CC0 (in Band I), CC1 (in Band II) and CC2 (in Band III). CC0 is PCC, CC1 is SCC0 and CC2 is SCC1. Based on the consideration of minimized adjacent channel interference, CC0 adopts frame structure configuration 1, CC1 adopts frame structure configuration 3 and CC2 adopts frame structure configuration 0. Refer to the scene schematic diagram shown in FIG. 8 for the method for determining the ACK/NACK sub-frames. As shown in FIG. 8, the method includes:

Step 800: The UE respectively determines the timing relationship between the PDSCH and ACK/NACK for each SCC with different frame structure configuration according to the frame structure configurations of the PCC, SCC0 and SCC1, which specifically includes:

Step 801: The UE determines the number of uplink public sub-frames as sub-frame 2 according to the frame structure configurations of PCC and SCC0.

Step 802: The UE selects the configuration, i.e., the frame structure configuration 4 in Frame Structure 2 (FS2), the uplink sub-frames of which merely include sub-frame 2 and sub-frame 3 from the existing seven kinds of frame structure configurations according to the result of step 801.

Step 803: The UE determines the number of the uplink public sub-frames as sub-frame 2, sub-frame 3, sub-frame 7 and sub-frame 8 according to the frame structure configurations of PCC and SCC1.

Step 804: The UE selects the configuration, i.e., the frame structure configuration 1 in Frame Structure 2 (FS2), the uplink sub-frames of which merely include sub-frames 2, 3, 7 and 8 from the existing seven kinds of frame structure configurations according to the result of step 803.

Step 805: The UE merely adopts the timing relationship between the PDSCH and ACK/NACK corresponding to the frame structure configuration determined in steps 802 and 804 for the SCCs. That is, the UE feeds back the ACK/NACK information for SCC0 adopting the timing relationship between the PDSCH and ACK/NACK corresponding to the frame structure configuration 4 determined, and feeds back the ACK/NACK information for SCC1 adopting the timing relationship between the PDSCH and ACK/NACK corresponding to frame structure configuration 1. But, the PCC sill determines the timing relationship between the PDSCH and ACK/NACK according to its frame structure configuration.

It should be noted that in the above embodiments, when the UE is configured with more than two PCCs, the eNB notifies the UE of the number of the PCC for feeding back the ACK/NACK through the RRC signaling.

All the above embodiments are illustrating examples, in actual application, the PCC not only can feed back the ACK/NACK information according to the timing relationship between the PDSCH and ACK/NACK corresponding to the selected configuration, but also can feed back the ACK/NACK information according its own frame structure configuration. Further, for the specific sub-frames in the bundled window, the ACK/NACK corresponding to the uplink data sub-frames can be definitely either mapped into the DTC status, or not feeding back any ACK/NACK information.

Figure 9:
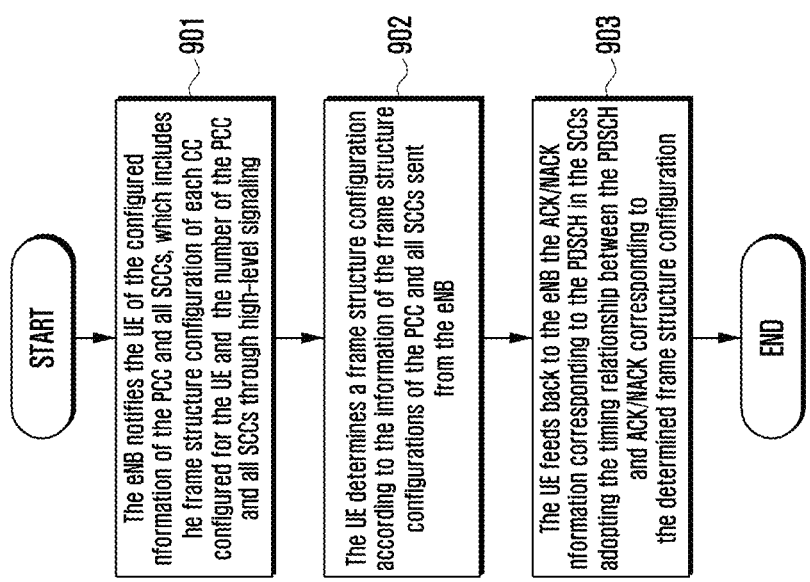
FIG. 9 is a work flow chart of ACK/NACK feedback method two according to an embodiment of the present invention.

Corresponding to the flow of method one shown in FIG. 3, FIG. 9 shows a work flow of ACK/NACK feedback method two of the present invention. As shown in FIG. 9, the flow includes:

Block 901: The eNB notifies UE of the configured information of the PCC and all SCCs through high-level signaling. The configured information of the PCC and all SCCs of the UE includes: the frame structure configuration of each CC configured for the UE, and further includes the number of the PCC and all SCCs.

Block 902: The UE determines a kind of frame structure configuration according to the information of the frame structure configurations of the PCC and all SCCs sent from the eNB.

In this block, the UE may uniquely determine a kind of backward compatible frame structure configuration according to the configured information of the CCs sent from the eNB. The UE determines a kind of frame structure configurations as shown in table 1 according to the information of the frame structure configurations of the PCC and all SCCs sent from the eNB, which specifically includes:

Suppose that in the information of the CC configured for the UE and any radio frame, the configuration including two uplink and downlink sub-frame switching points is the configuration of the first class and the other configurations are the configurations of the second class. The two kinds of configurations of UE are configuration A and configuration B.

When configuration A and configuration B belong to a same class of configuration, and the proportion of the uplink sub-frames in configuration A is larger than that of configuration B, configuration B is determined.

When configuration A and configuration B do not belong to a same class of configuration, and either of configuration A and configuration B is configuration 0, the configuration other than the configuration 0 in configuration A and configuration B is determined.

When configuration A and configuration B do not belong to a same class of configuration, neither of configurations A and B is configuration 0 and either of them is configuration 6, the configuration other than the configuration 6 in configuration A and configuration B is determined.

When configuration A and configuration B do not belong to a same class of configuration and either of configurations A and B is configuration 5, configuration 5 is determined.

When (A, B) is (1, 3) or (1, 4), configuration 4 is determined.

When (A, B) is (2, 3) or (2, 4), configuration 5 is determined.

Block 903: The UE feeds back to the eNB the ACK/NACK information corresponding to the PDSCH in the SCCs on the PCC adopting the timing relationship between the PDCH and ACK/NACK corresponding to the determined frame structure configuration.

Further, the UE feeds back to the eNB the ACK/NACK information corresponding to the PDSCH in the PCC on the PCC adopting the timing relationship between the PDCH and ACK/NACK corresponding to the determined configuration. Alternatively, the UE feeds back to the eNB the ACK/NACK information corresponding to the PDSCH in the PCC on the PCC adopting the timing relationship between the PDCH and ACK/NACK corresponding to its own frame structure configuration.

It should be noted that when the bundled window of the downlink data sub-frames determined by the UE includes the uplink data sub-frames, the ACK/NACK corresponding to the uplink data sub-frames are definitively mapped into a DTX status, or not feeding back any ACK/NACK information.

At this point, the whole work flow of ACK/NACK feedback method of the present invention is finished.

In brief, with the ACK/NACK feedback method in the wireless communication system provided by embodiments of the present invention, the UE determines the number of public sub-frames, all of which are uplink sub-frames in the PCC and SCC sub-frames of any radio frame according to the configured frame structure configurations of the PCC and any SCC, selects the configuration, the uplink frames of which merely include sub-frames corresponding to the determined number of the public sub-frames from the existing seven kinds of frame structure configurations, and feeds back to the eNB the ACK/NACK information corresponding to the PDSCH in the SCC on the PCC adopting the timing relationship between the PDSCH and ACK/NACK corresponding to the selected configuration. Alternatively, the eNB notifies the UE of the configured information of the PCC and all SCCs through the high-level signaling. The UE determines a frame structure configuration according to the information of the frame structure configurations of the PCC and all SCCs sent from the eNB, and feeds back to the eNB the ACK/NACK information corresponding to the PDSCH in the SCCs on the PCC using the timing relationship between the PDSCH and ACK/NACK corresponding to the determined frame structure configuration.

Further, when the UE is configured with multiple CCs, and the frame structure configuration of at least one CC is different from the frame structure configurations of the other CCs, the method of the present invention may adaptively select and determine a timing relationship between the PDSCH and UL ACK/NACK according to the configured frame structure configuration of the CC without changing the existing algorithm of the scheduler, and feed back the ACK/NACK information on the PCC. Therefore, the ACK/NACK feedback method of the present invention may effectively support the carrier aggregation between Bands of different frame structure configurations and implement the coexistence and performance optimization of different communication systems without limiting the number of amplifiers of the UE.

The foregoing only describes preferred examples of the present invention and is not used to limit the protection scope of the present invention. Any modification, equivalent substitution and improvement without departing from the spirit and principle of the present invention are within the protection scope of the present invention.

What is claimed is:

1. A method for transmitting feedback information by a terminal supporting a time division duplex (TDD) in a wireless communication system, the method comprising:

receiving downlink data on a physical downlink shared channel (PDSCH) of a secondary cell (SCell);

determining at least one subframe which is an uplink subframe for both of a primary cell (PCell) and the SCell, based on a first TDD frame structure configuration of the PCell and a second TDD frame structure configuration of the SCell;

determining, based on a subframe index of the determined at least one subframe, a third TDD frame structure configuration among a plurality of configured TDD frame structure configurations, wherein a subframe index of an uplink subframe for the third TDD frame structure configuration is the same as the subframe index of the determined at least one subframe; and transmitting a hybrid automatic repeat request (HARQ) acknowledgement (ACK) response for the downlink data received on the SCell, the HARQ ACK response being transmitted in the uplink subframe for the third TDD frame structure configuration on the PCell, wherein the uplink subframe for the third TDD frame structure configuration is determined based on a timing relationship between a PDSCH and a HARQ ACK response corresponding to the third TDD frame structure configuration, and wherein the first TDD frame structure configuration, the second TDD frame structure configuration and the third TDD frame structure configuration are different.

2. The method of claim 1, wherein the determined at least one subframe is a public subframe for the first TDD frame structure configuration and the second TDD frame structure configuration, and wherein all of the public subframe is an uplink subframe for the PCell and the SCell.

3. The method of claim 1, further comprising:

receiving downlink data on a PDSCH of the PCell; and transmitting a HARQ ACK response for the downlink data received on the PCell in an uplink subframe associated with the first TDD frame structure configuration, on the PCell.

4. The method of claim 1, wherein the third TDD frame structure configuration includes only the determined at least one subframe as an uplink subframe.

5. A terminal for transmitting feedback information and supporting a time division duplex (TDD) in a wireless communication system, the terminal comprising:

a transceiver configured to transmit and receive a signal; and a controller coupled with the transceiver and configured to:

control the transceiver to receive downlink data on a physical downlink shared channel (PDSCH) of a secondary cell (SCell), determine at least one subframe which is an uplink subframe for both of a primary cell (PCell) and the SCell, based on a first TDD frame structure configuration of the PCell and a second TDD frame structure configuration of the SCell, determine, based on a subframe index of the determined at least one subframe, a third TDD frame structure configuration among a plurality of configured TDD frame structure configurations, wherein a subframe index of an uplink subframe for the third TDD frame structure configuration is the same as the subframe index of the determined at least one subframe, and control the transceiver to transmit a hybrid automatic repeat request (HARQ) acknowledgement (ACK) response for the downlink data received on the SCell, the HARQ ACK response being transmitted in the uplink subframe for the third TDD frame structure configuration on the PCell, wherein the uplink subframe for the third TDD frame structure configuration is determined based on a timing relationship between a PDSCH and a HARQ ACK response corresponding to the third TDD frame structure configuration, and wherein the first TDD frame structure configuration, the second TDD frame structure configuration and the third TDD frame structure configuration are different.

6. The terminal of claim 5, wherein the determined at least one subframe is a public subframe for the first TDD frame structure configuration and the second TDD frame structure configuration, and wherein all of the public subframe is an uplink subframe for the PCell and the SCell.

7. The terminal of claim 5, wherein the controller is further configured to:

control the transceiver to receive downlink data on a PDSCH of the PCell, and control the transceiver to transmit a HARQ ACK response for the downlink data received on the PCell in an uplink subframe associated with the first TDD frame structure configuration, on the PCell.

8. The terminal of claim 5, wherein the third TDD frame structure configuration includes only the determined at least one subframe as an uplink subframe.

\* \* \* \* \*